INVENTOR.
JACK V. MILLER

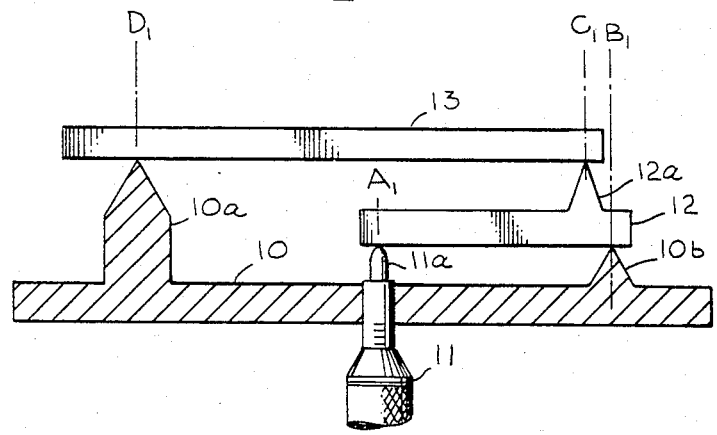
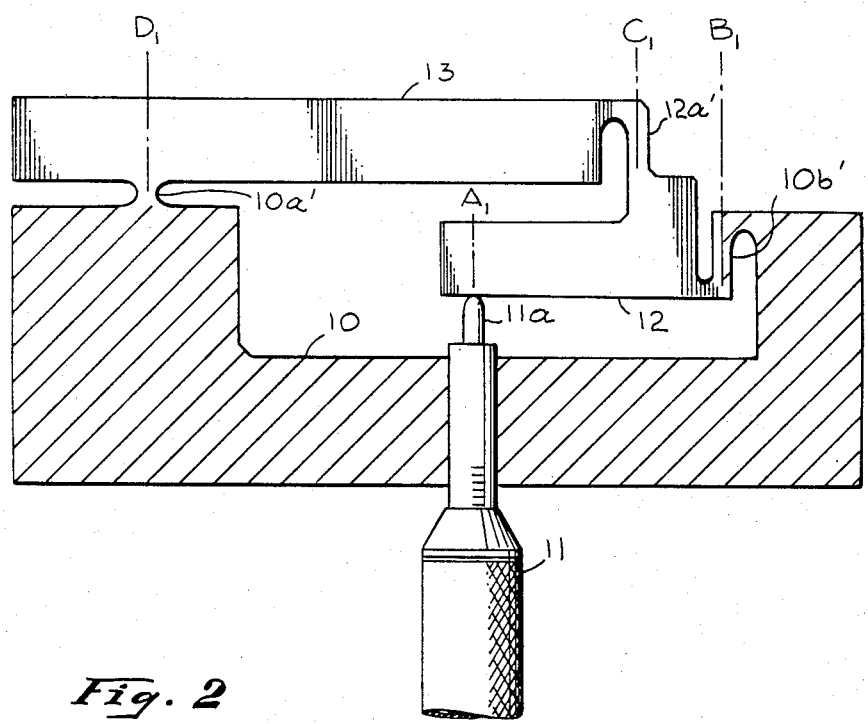

United States Patent Office 3,407,018
Patented Oct. 22, 1968

3,407,018
TWO-AXIS ANGULAR POSITIONING APPARATUS FOR ADJUSTING THE POSITION OF AN OPTICAL ELEMENT
Jack V. Miller, Azusa, Calif., assignor to Electro-Optical Systems, Inc., Pasadena, Calif.
Filed Jan. 30, 1964, Ser. No. 341,451
2 Claims. (Cl. 350—321)

ABSTRACT OF THE DISCLOSURE

An angular positioning apparatus having an optical element mounted on a beam supported at both ends by taut-band flexure pivots and a lever supported at one end by a taut-band flexure pivot and supporting one of the beam flexure pivots with the beam and lever arranged so that the optical element is rotated about its axis with a large mechanical advantage.

---

The present invention relates in general to apparatus for making extremely fine adjustments and more particularly relates to a device for accurately rotating a mirror or other optical element in very small angular increments.

As is well known, reflecting mirrors and optical lenses are very extensively used both for commercial and scientific purposes. However, whatever the field of use, there is oftentimes a need in the application of these elements to rotate them in one direction or another without, at the same time, changing or deleteriously affecting the accuracy or operating characteristics of the instruments or apparatus in which the optical elements are employed. This need exists whether the angular increments of rotation are large or small. As an example of what is meant, one of the many problems encountered in the prior art on this subject matter is that an angular rotation of the element is accompanied by a physical or linear displacement of the element as well. These displacements are undesirable. In the case of a mirror, for example, any displacement of the mirror other than rotational introduces a new point of reflectance, with the result that the intensity or the spectral response of the reflected beam of light may change, not because the nature of the light itself has changed but, rather, because the light is being reflected from a different point on the mirror. Again, in the prior art devices, rotation of a mirror or some other element involves moving parts and this, in turn, results in the generation of frictional forces which limit the accuracy and sensitivity of these devices.

It is therefore a general object of the present invention to provide a device for rotating an optical element in very small angular increments.

It is a further object of the present invention to provide a device for rotating optical elements that is extremely accurate and sensitive.

It is another object of the present invention to provide an angular positioning mechanism in which the effect of frictional forces is substantially eliminated.

It is an additional object of the present invention to provide an angular positioning device in which angular rotation of an optical element does not also produce physical or linear displacement.

In accordance with the basic concept of the present invention, the above-stated objects may be achieved by providing a device in which there are no moving parts, that is to say, there are no parts that move against one another and in which the axes of rotation are in a plane that is in the plane of the element being rotated. More particularly, the basic mechanism involved here is a compound flexure which has the effect of providing a pair of arms or levers against which a pair of micrometer heads respectively operate, the micrometer heads being provided in order to respectively generate angular increments for each of two separate axes that lie in the same plane as the plane of the optical element, such as, for example, the reflecting surface of a mirror. The fact that the plane of the axes of rotation lies in the plane of the optical element is important because it is in this way that physical or linear displacement is avoided during rotation. In the prior art devices, the two axes of rotation, such as, for example, the X and Y axes, do not lie in the same plane. Furthermore, the precision motions are performed by a relatively simple structure that is machined entirely from one block of metal and all pivots therein are accomplished through flexing within the elastic limits of the material involved, thereby eliminating erratic operation due to friction.

Aside from the avoidance of friction and displacement problems, the present invention has the further advantage of providing a mechanical advantage. For each axis, a short lever against which the micrometer head pushes at one end is suspended at its other end on a unique taut-band flexure suspension capable of accommodating large angular movements. A second taut-band suspension interconnects this lever with a beam in which is mounted the optical element, the center-line or axis of rotation of the second flexure suspension being displaced from the axis of rotation of the primary lever flexure by a small distance. This displacement of center-lines establishes a mechanical advantage which is equal to the ratio of the center-line displacement distance to the length of the primary lever arm.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a mechanical schematic that may be used to illustrate and explain the principles of the present invention;

FIGURE 2 illustrates the mechanical analogy of the FIGURE 1 schematic; and

Figure 3:
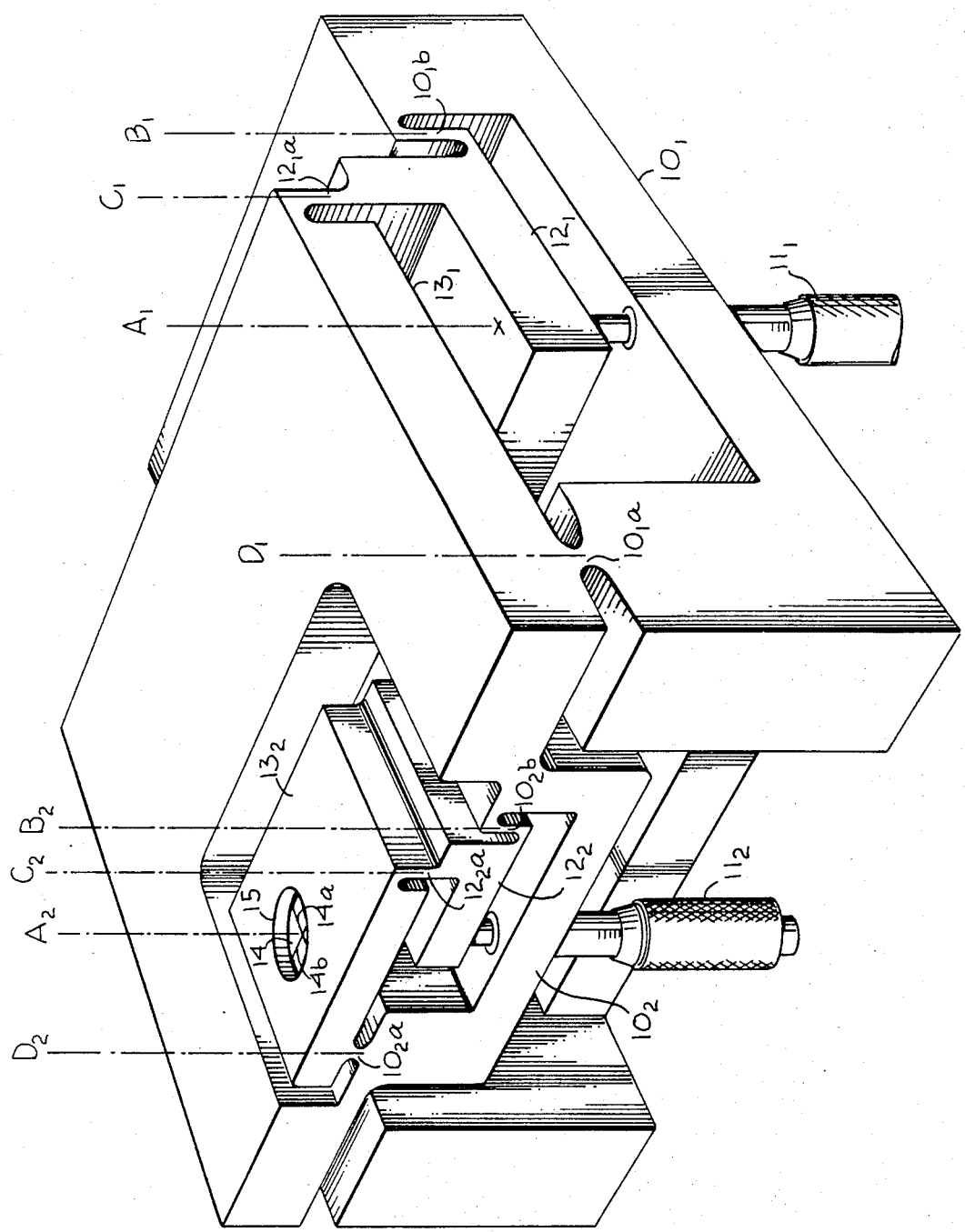
FIGURE 3 shows an entire two-axis angular positioner device constructed in accordance with the present invention.

For a consideration of the invention in detail, reference is now made to the drawings wherein an embodiment of the invention and schematics for explaining the principles thereof are illustrated. Referring in particular to the schematic in FIG. 1, a base or support member 10 is shown through which a micrometer 11 extends vertically between a pair of fulcrums or pivots 10a and 10b integral with and extending upward from the base. As shown, pivots 10a and 10b rise to different levels, with pivot 10a being the taller of the two, the tip of pivot 10b being at the same level with the end of the movable micrometer head 11a when the latter is in its normal position. Bridging micrometer head 11a and pivot 10b and resting thereon is a lever 12 which also has a pivot 12a extending upwardly from it in the vicinity of the lever end that is supported by pivot 10b. Again, with head 11a in its normal position, the tip of pivot 12a is at the same height or level as the tip of pivot 10a. Completing the picture is a beam 13 which bridges and rests on pivots 10a and 12a.

It will be noticed from the figure that the center-line for micrometer 11, which center-line extends through the point of contact between head 11a and lever 12, is designated $A_1$, that the center-lines for pivots 10b and 12a, which extend through the peaks of these pivots, are respectively designated $B_1$ and $C_1$, and that the center-line extending through the peak of pivot 10a is designated $D_1$. It will also be noticed that center-lines $B_1$ and $C_1$ are displaced from each other by a relatively small distance. As will be seen later, this displacement of center-lines establishes a mechanical advantage equal to the ratio of the length of the primary lever arm, namely, lever 12, to the above-said center-line displacement distance.

In operation, if micrometer 11 is turned slightly so that its head 11a extends or moves upward through a small distance $d$ lever 12 is correspondingly rotated in a clockwise direction about pivot 10b. As a result, pivot 12a is likewise moved upward and, because of it, beam 13 is rotated in a counter-clockwise direction about pivot 10a. It will be recognized by those skilled in the art that the end of lever 12 that is supported by head 11a is rotated through a much larger angle than the end of beam 13 that is supported by pivot 10a, the difference between the two angles being determined by the length of lever 12 and the length of beam 13. Mathematically speaking, Effective arm length $= A_1B_1/B_1C_1 \times C_1D_1$ where, $A_1B_1$ is the distance between $A_1$ and $B_1$
$B_1C_1$ is the distance between $B_1$ and $C_1$, and
$C_1D_1$ is the distance between $C_1$ and $D_1$.

The fraction $A_1B_1/B_1C_1$ is known as the "mechanical advantage." By way of example, if $A_1B_1 = 1.00$ inch
$B_1C_1 = 0.010$ inch
$C_1D_1 = 2.00$ inches Then, by substitution in the above equations, the mechanical advantage is 100 and the effective arm length is 200. Thus, under the example given, for an increment of 0.001 inch applied at the micrometer end of the 200 inch lever arm, the angular change at the pivot 10a end of beam 13 is 0.10 arc second. At the pivot 10b end of lever 12, however, the angular change is 20 arc seconds.

Having thus provided an understanding of the mechanics of the present invention and the principles of its operation, reference is now made to FIG. 2 wherein the mechanical analogy of the FIG. 1 schematic is presented, the same or similar designations being used in FIG. 2 for elements corresponding to those in FIG. 1. Thus, in FIG. 2, numerals 10, 11, 12 and 13 respectively designate the support, the micrometer, the lever and the beam, as before. However, instead of using pivots of the kind shown in FIG. 1, the FIG. 2 device incorporates taut-band pivot flexures which are designated 10a', 10b' and 12a'. These taut-band flexures perform the same function as the earlier described ones but, by their nature, permit the entire gimbal mechanism to be machined from a single block of metal. It should also be mentioned that the center-lines for the pivot flexures are designated as they were before, namely, $A_1$, $B_1$, $C_1$ and $D_1$ and, therefore, that the effective arm length is likewise $A_1B_1/B_1C_1 \times C_1D_1$.

The operation of the FIG. 2 mechanism is substantially as it was previously described. Thus, an extension of micrometer head 11a has the effect of rotating lever 12 in a clockwise direction about flexure pivot 10b'. This, in turn, produces a corresponding upward movement of flexure pivot 12a', thereby causing beam 13 to rotate in a counter-clockwise direction about flexure pivot 10a'. Because of the relatively large effective lever arm obtained, the angle through which beam 13 is rotated at center-line $A_1$, the ratio of the two angles being determined by the abovesaid lever length and beam length.

It was already mentioned that the flexure pivots permit a one piece construction. It should also be mentioned, however, that because of these flexure pivots, there is no friction or stiction, thereby eliminating the problems accompanying these forces.

The gimbal structure in FIG. 2 is designed to provide for the rotation of an optical element about a single axis. Hence, in order to provide for the rotation of the same optical element about a second axis, preferably orthogonal to the first, a second such gimbal structure is needed. Two such gimbals, therefore, would permit rotation of the optical element in any direction. Furthermore, if both axes of rotation are in the same plane and also in the plane of the optical element, as is true in the case of the present invention, then there is never any physical or linear displacement of the element during rotation or, stated differently, the point on the surface of the optical element that coincides with the point of intersection of the two axes remains fixed in position at all times. This has the advantage of ensuring a point of constant reflectance.

A complete two-axis angular positioning apparatus is shown in FIGURE 3 and although the structure shown therein appears quite complicated, it is basically made up of two gimbal structures of the kind shown in FIG. 2, one inside the other, one such structure for each axis of rotation. However, it must be emphasized that both structures are machined out of the same block of material and, therefore, that a continuous single structure is, in reality, involved, as may be seen or determined from an examination of the figure. In other words, except for the micrometers, the structure shown in FIG. 3, is one piece.

Thus, $12_1$ and $13_1$ respectively designate the lever and beam of one gimbal, the outer one, and $12_2$ and $13_2$ respectively designate the lever and beam of the other gimbal, namely, the inner one. Similarly, the flexure pivots in the outer gimbal are designated $10_1a$, $10_1b$ and $12_1a$, whereas they are designated $10_2a$, $10_2b$ and $12_2a$ in the inner gimbal. Of course, the two micrometers are likewise designated $11_1$ and $11_2$ as are the two supports which are designated $10_1$ and $10_2$.

The optical element, designated 14, is mounted in an opening 15 in beam $13_2$, the plane of the significant optical element surface being indicated by orthogonal lines 14a and 14b. With respect to lines 14a and 14b, the FIG. 3 device is so constructed that the axes of rotation for beam $13_1$, which runs through flexure pivot $10_1a$, is parallel to and in the plane of line 14a, whereas the axis of rotation for beam $13_2$, which runs through flexture pivot $10_2a$, is parallel to and in the plane of line 14b. Consequently, as was previously stated, the axes of rotation are in the same plane as the optical surface.

The operation of the FIG. 3 embodiment is substantially the same as previously delineated in connection with the FIG. 2 device and, therefore, to avoid being redundant, it is not reviewed here in detail. Suffice it is to say, therefore, that with the aid of micrometer $11_2$, the gimbal in which element 14 is mounted, that is to say, the inner gimbal, is rotated about the axis of pivot $10_2a$ whereas, with the aid of micrometer $11_1$, the outer gimbal is rotated about the axis of pivot $10_1a$. However, it should be mentioned that when the inner gimbal is rotated, it rotates alone or by itself whereas when the outer gimbal is rotated, the inner gimbal rotates with it, that is to say, the two gimbals move together as a unit. In this way, rotation may be obtained about either axis.

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A one-piece structure for selectively rotating an optical element in very small angular increments about a pair of axes, said structure comprising: a pair of gimbal devices, one inside the other, fabricated out of the same piece of material to form a continuous structure, the inner gimbal device being constructed to rotate about one axis and to rotate the outer gimbal device as a unit about the other axis, each of said gimbal devices including a base member having an opening therethrough; means capable of selectively moving forward and backward mounted in said opening and extending therethrough; a lever abutting at one end against said means and interconnected with said base member at its other end, said interconnection being a flexure pivot integral with and extending between said lever and base member; and a beam positioned above and spaced from said lever, said beam respectively being interconnected at its ends with said lever and said base member, said interconnections being flexure pivots that are integral with and extend between said beam and said lever and base member, the flexure pivot interconnecting said beam with said lever being displaced a different distance from said means than the flexure pivot interconnecting said lever with said base member.

2. The structure defined in claim 1 wherein said pair of sets are constructed such that the axes or rotation thereof are in a plane and wherein the optical element is mounted in such a manner on the beam of said inner set that the significant optical element surface is in the same plane as the said axes of rotation

References Cited

UNITED STATES PATENTS 3,056,207  10/1962  Brault _____ 33—72

FOREIGN PATENTS 827,339  2/1960  Great Britain.

JEWELL H. PEDERSEN, *Primary Examiner.*

O. B. CHEW, *Assistant Examiner.*